April 15, 1958     C. G. TAYLOR     2,830,612
ANTI-CONDENSATION DEVICE FOR FLUSH TANKS
Filed April 13, 1950

INVENTOR.
CHESTER G. TAYLOR
BY
*Armand G. Cyr*
ATTORNEY

United States Patent Office 2,830,612
Patented Apr. 15, 1958

2,830,612

ANTI-CONDENSATION DEVICE FOR FLUSH TANKS

Chester G. Taylor, Gary, Ind.

Application April 13, 1950, Serial No. 155,695

1 Claim. (Cl. 137—337)

This invention relates to flush tanks in water closets, and more particularly to an anti-condensation device for flush tanks arranged in the water distribution system for such tanks.

It is well known that condensation of moisture will accumulate on the exterior of flush tanks of water closets or toilets, particularly in the summer time, when the room temperature is much higher than the temperature of the water entering the flush tank when the toilet is flushed. This accumulation of moisture on the exterior of the flush tank often results in dripping of water on the bathroom floor and dampness in the bathroom. By substantially equalizing the temperature of the water entering the flush tank to the temperature of the room wherein such tank is located, the condensation of moisture on the exterior of the flush tank, commonly referred to as sweating, may be eliminated.

It is therefore the primary object of my invention to provide novel means arranged in the water distribution system of the home or the like, whereby a mixture of hot and cold water will flow through the inlet pipe of the flush tank each time the tank is flushed.

Another object is to provide a device that may be readily and quickly connected to the hot and cold water line of the conventional water distribution system and form a mixing chamber, whereby a mixture of hot and cold water will be supplied from said chamber to the flush tank inlet.

A further object is to provide a fluid mixing device of simple and inexpensive construction for connection with a hot and cold water line whereby a mixture of hot and cold water will flow from the mixing chamber of said device into the cold water line without interfering with the normal flow of hot water through the hot water line.

A still further object is to furnish a fluid mixing device in the hot and cold water distributing system, having novel valve mechanism permitting hot water to mix with the cold water in the cold water line, but preventing the cold water from entering the hot water line.

With the foregoing objects outlined, and with other objects in view which will appear as the description proceeds, this invention consists in the novel features hereinafter described in detail, illustrated in the accompanying drawing, and more particularly pointed out in the appended claim.

Figure 1:
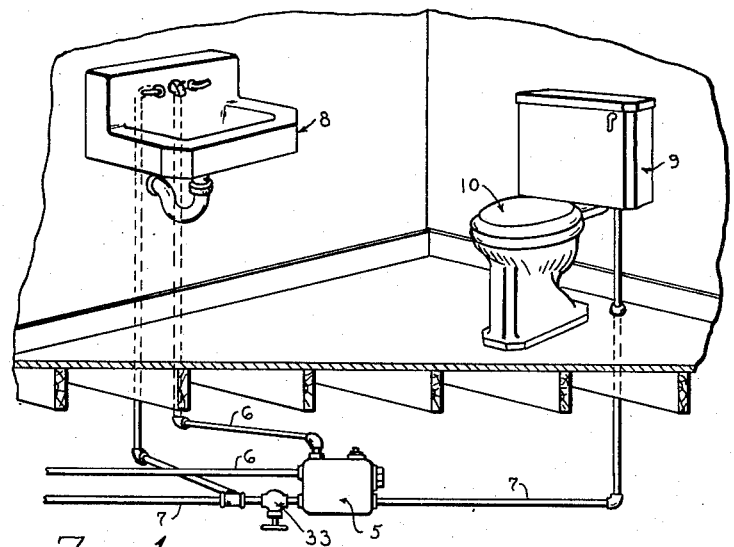
Fig. 1 is a diagrammatic view of a portion of a conventional hot and cold water distributing system for a toilet and wash bowl, with my improved mixing device arranged in said system.

Referring to the drawing in detail, 5 designates generally my improved fluid mixing device connected to a hot water line 6 and a cold water line 7. These lines receive their supply of hot and cold water, respectively, from conventional supply sources provided for homes and the like, and supply the required hot and cold water for the wash basin 8, and the cold water for the flush tank 9 of the toilet 10.

By arranging my mixing chamber 5 in the hot and cold water distributing system, as shown in Fig. 1, the normal supply of hot and cold water to the wash basin 8 continues uninterrupted, but the cold water supply line to the flush tank 9 is provided with a mixture of hot and cold water each time the tank is flushed.

Figures 2, 3:
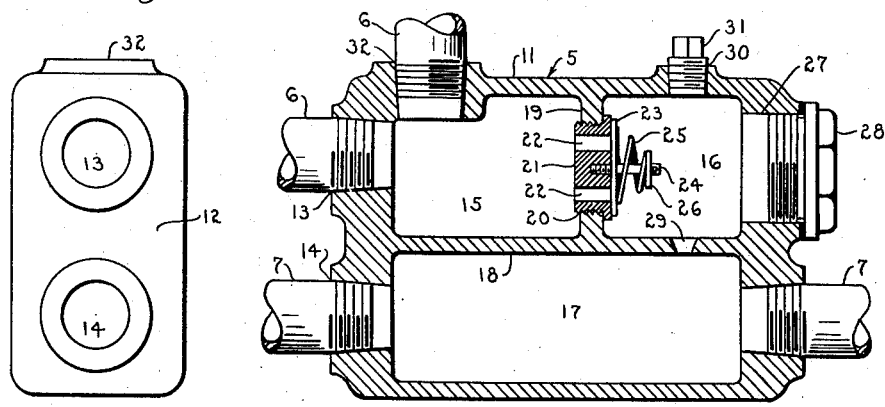
Fig. 2 is an end view of my fluid mixing device.
Fig. 3 is a horizontal sectional view of one form of my fluid mixing device.

Turning now to the details of construction of my invention, as illustrated in Figs. 2 and 3, it will be noted that my improved mixing device comprises a casing or housing 11 of substantially rectangular shape and preferably made of brass or similar material. One end 12 of the casing is provided with inlet openings 13 and 14 to receive the respective hot water pipe 6 and cold water pipe 7.

In this embodiment of the invention, the inside of the casing 11 is divided into three chambers 15, 16 and 17. A horizontal central partition 18 separates the chamber 17 from the chambers 15 and 16, while the vertical partition 19 separates the chambers 15 and 16. The partition 19 may be provided with a threaded opening 20 adapted to receive a threaded valve seat 21 having suitable passageways 22 through which the water may, under certain conditions, flow from chamber 15 to chamber 16. A valve disc 23 loosely mounted on a valve stem 24 secured to the valve seat 21 acts to close the passageways 22. The valve is normally held in closed position by a coil spring 25, one end of which bears against the valve disc, while its opposite end abuts against a collar or the like 26 secured to the free end portion of the stem 24.

In order to insert or remove a valve assembly from the casing, I provide an opening 27 in the rear wall of the casing, in alignment with the valve assembly. A removable plug 28 is provided in this opening whereby the valve may be readily reached for replacement or for adjusting or replacing the spring 25.

A substantially cone-shaped orifice 29 is provided in the partition 18 whereby any hot water flowing through the passageways 22 from the chamber 15 to the chamber 16 may thence flow into chamber 17 for admixture with the cold water entering the latter chamber through the cold water inlet 7. For the purpose of varying the size of the orifice 29, a plurality of concentric cone-shaped plugs (not shown) may be inserted into or removed from this orifice through the opening 30 provided in the top of the casing, in alignment with said orifice. A removable plug 31 normally closes said opening 30.

As this fluid mixing device is preferably connected to the hot water line 6 leading to the wash basin 8, and between the cold water line 7 leading to said basin and to the flush tank, I provide a hot water outlet 32 in the top of the casing, leading from chamber 15 to the conventional hot water supply line 6 for the wash basin.

As heretofore indicated, the mixing device is also connected to the cold water supply line 7, preferably between the supply line to the wash basin and the supply line to the flush tank.

In the operation of the device, it can be assumed that the pressures in the hot and cold water lines respectively are substantially equal. However, upon flushing of the toilet 10, a supply of water will start flowing from the chamber 17 through the pipe 7 to the flush tank 9, thus causing a drop in the pressure in chamber 17, as well as in chamber 16 with which it communicates, while the pressure in chamber 15 remains the same. Due to this drop in pressure in chambers 16 and 17, caused by the flow of water from the mixing device to the flush tank, the hot water in chamber 15 will force the valve 23 away from its seat, thus allowing the hot water to flow into chamber 16 and thence through orifice 29 into chamber 17 for admixture with the cold water passing therethrough. It will also be understood that as the water flows out of chamber 17 into the flush tank 9, a suction will be created thereby through orifice 29, thus tending further to unseat the valve 23 and allowing hot water to flow from chamber 15 through chamber 16 and into chamber 17. In this way, each time the toilet is flushed, a supply of hot water is admixed with the cold water in chamber 17 prior to its flow into the flush tank.

A conventional hand valve 33 may be provided in the cold water line 7, in advance of the mixing device, for controlling the flow of cold water to the chamber 17. By restricting the flow of cold water to the chamber 17, while the hot water flows unrestrictedly into chamber 15, it will be evident that when the toilet is flushed, the greater pressure in the hot water chamber 15 will cause the valve 23 to open and permit hot water to flow to chamber 16, through orifice 29, into the chamber 17 for admixture with the cold water flowing to the flush tank. By adjusting the valve 33, an effective control can be obtained on the amount of hot water that will be permitted to enter chamber 17 for admixture with the cold water therein.

Figure 4:
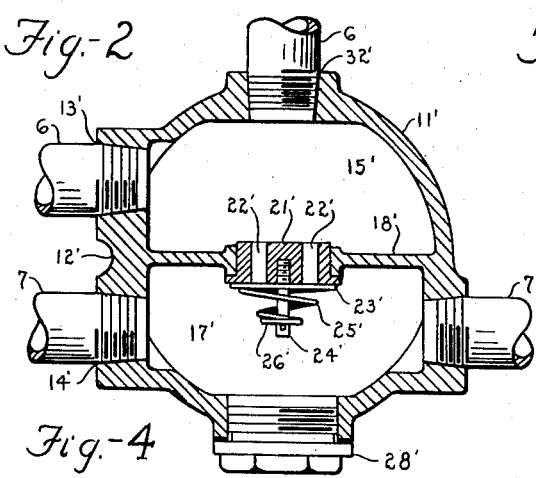
Fig. 4 is view similar to Fig. 3, but showing another form of fluid mixing device.

Referring now to the embodiment of the invention shown in Fig. 4, it will be noted that while I have shown a casing 11' of slightly different configuration than that shown in Figs. 2 and 3, the invention may be carried out with either type casing.

In this embodiment of the invention, the casing is divided into two compartments or chambers 15' and 17' by a horizontal partition 18', which, like the partition 18 in Fig. 3, is preferably formed integral with the outer walls of the casing.

Suitable inlet openings 13', 14' are provided in the front wall 12' of the casing for connection respectively to the hot water supply line 6 and the cold water supply line 7. A hot water outlet 32' leads from the chamber 15' to the wash basin 8.

The valve assembly in this form of the invention is similar to that shown in Fig. 3 and accordingly, the various individual parts are identified with similar reference characters, with the addition thereto of the (') symbol. However, it should be noted that while the valve seat 21 in Fig. 3 is shown threaded, and in Fig. 4 (21') as press fitted into the opening in the partition, these elements may be used interchangeably in either modification, or, if preferred, the valve seat 21 or 21' may be made an integral part of the partition 18 or 18'.

The mixing device shown in Fig. 4 is arranged in the water supply system in the same manner shown in Fig. 1. However, in the device shown in Fig. 4, the hot water chamber 15' is in direct communication with the chamber 17', so that when the pressure on the water in chamber 17' drops, as the result of a flushing of the toilet 10, the hot water in chamber 15' will flow directly to the chamber 17' and be admixed with the cold water flowing therethrough to the flush tank.

From the foregoing it will be apparent to those skilled in the art that I have provided a novel fluid mixing device for installation in a water distributing system of a home or the like, whereby a mixture of hot and cold water may be insured for supply to a flush tank at all times. By providing this mixture of hot and cold water from the conventional water supply system of a home or the like, I thereby avoid the necessity of preheating the water before it reaches the flush tank, and at the same time insure a supply of temperate water for the flush tank which eliminates sweating of the tank.

While I have shown and described what I now consider to be preferred embodiments of my invention in such manner that those skilled in the art may readily understand its construction and operation, I am aware that changes may be made in the details disclosed, without departing from the spirit of the invention as expressed in the following claim.

What I claim and desire to secure by Letters Patent is:

In a water supply system including a hot water line and a cold water line, the pressure in said lines being equal when the system is in static condition, the combination of a flush tank connected to the cold water line, means for operating said tank, a mixing device arranged in said system in advance of said flush tank and comprising a casing, means in said casing dividing the latter into hot and cold water chambers, a partition dividing said hot water chamber into primary and secondary chambers, the primary chamber having inlet and outlet means connected to the hot water line and the cold water chamber having inlet and outlet means connected to the cold water line, the last mentioned outlet means leading to the flush tank, said dividing means having an orifice placing said cold water chamber in communication with the secondary chamber, a passageway in said partition placing said primary chamber in communication with said secondary chamber, and a valve in said passageway responsive to variations in the pressure of the water in the cold water chamber and the pressure of the water in the primary chamber when the flush tank is operated, for controlling the flow of the hot water from the primary chamber to the secondary chamber, while preventing the flow of water from the secondary chamber to the primary chamber.

References Cited in the file of this patent
UNITED STATES PATENTS

| | | |
|---|---|---|
| 828,138 | O'Neill | Aug. 1, 1906 |
| 843,080 | Ermentrout | Feb. 5, 1907 |
| 1,223,976 | Hiller | Apr. 24, 1917 |
| 1,247,374 | Chubb | Nov. 20, 1917 |
| 1,289,383 | Buell | Dec. 31, 1918 |
| 1,435,883 | Spohn | Nov. 14, 1922 |
| 1,635,745 | Ellis | July 12, 1927 |
| 1,698,342 | McGill | Jan. 8, 1929 |
| 1,989,248 | Scott | Jan. 29, 1935 |
| 2,074,883 | Ziebolz | Mar. 23, 1937 |
| 2,096,125 | McDougall | Oct. 19, 1937 |
| 2,424,163 | Hammer | July 15, 1947 |
| 2,465,866 | Gaines | Mar. 29, 1949 |
| 2,494,044 | Jurisich et al. | Jan. 10, 1950 |
| 2,581,855 | Griffith | Jan. 8, 1952 |
| 2,592,380 | Beckett | Apr. 8, 1952 |
| 2,659,898 | Toye | Nov. 24, 1953 |